US008678309B2

(12) United States Patent
Heppe (10) Patent No.: US 8,678,309 B2
(45) Date of Patent: Mar. 25, 2014

(54) LIFTING GAS REPLENISHMENT IN A TETHERED AIRSHIP SYSTEM

(75) Inventor: Stephen Heppe, Hood River, OR (US)

(73) Assignee: Stratospheric Airships, LLC, Hood River, OR (US)

( * ) Notice: Subject to any disclaimer, the term of this patent is extended or adjusted under 35 U.S.C. 154(b) by 172 days.

(21) Appl. No.: 13/227,966

(22) Filed: Sep. 8, 2011

(65) Prior Publication Data

US 2012/0312919 A1 Dec. 13, 2012

Related U.S. Application Data

(63) Continuation-in-part of application No. 13/159,215, filed on Jun. 13, 2011.

(51) Int. Cl.
*B64B 1/02* (2006.01)
(52) U.S. Cl.
USPC .................................. 244/30; 244/29; 244/31
(58) Field of Classification Search
USPC .................................. 244/2, 30, 24, 29, 31, 33
See application file for complete search history.

(56) References Cited

U.S. PATENT DOCUMENTS

| | | | |
|---|---|---|---|
| 213,603 A * | 3/1879 | Apraxine | 244/33 |
| 1,549,061 A | 8/1923 | Chenu | |
| 1,372,924 A | 3/1929 | Anderson | |
| 1,818,138 A | 8/1931 | Howland | |
| 2,365,778 A * | 12/1944 | Schwab | 89/1.11 |
| 2,863,618 A | 12/1958 | Doyle et al. | |
| 3,260,480 A * | 7/1966 | Ash et al. | 244/31 |
| 3,279,419 A * | 10/1966 | Demarco | 116/210 |
| 3,412,958 A * | 11/1968 | Struble, Jr. | 244/33 |
| 3,424,405 A * | 1/1969 | Struble, Jr. | 244/31 |
| 3,605,329 A * | 9/1971 | Dalli | 446/225 |
| 3,834,655 A * | 9/1974 | Crosby, Jr. | 244/135 R |
| 4,082,063 A | 4/1978 | Strickland | |
| 4,995,572 A | 2/1991 | Piasecki | |
| 5,857,645 A | 1/1999 | Hodgson | |
| 6,010,093 A * | 1/2000 | Paulson | 244/24 |
| 6,142,414 A * | 11/2000 | Doolittle | 244/25 |

(Continued)

FOREIGN PATENT DOCUMENTS

| | | |
|---|---|---|
| GB | 2141088 A | 12/1984 |
| WO | 2005081680 A2 | 9/2005 |

OTHER PUBLICATIONS

Naval Research Advisory Committe, Lighter-Than-Air Systems for Future Naval Missions, Flag Officers and Senior Executive Service, The Pentagon Auditorium, Oct. 4, 2005.

(Continued)

*Primary Examiner* — Tien Dinh
*Assistant Examiner* — Justin Benedik
(74) *Attorney, Agent, or Firm* — Jeffrey K. Riddle; Van Cott, Bagley, Cornwall & McCarthy P.C.

(57) ABSTRACT

A system for lifting gas replenishment in a tethered airship system includes an upper airship with a first end of a tether attached to the upper airship. A balloon is configured to travel up the tether toward the upper airship carrying a payload of lifting gas. A method for gas replenishment of an airship is also provided.

22 Claims, 10 Drawing Sheets

(56) References Cited

U.S. PATENT DOCUMENTS

| | | | |
|---|---|---|---|
| 6,220,543 B1 | 4/2001 | Uskolovsky | |
| 6,224,015 B1* | 5/2001 | Reinhard | 244/24 |
| 6,422,506 B1 | 7/2002 | Colby | |
| 6,648,235 B2* | 11/2003 | Chan | 236/25 A |
| 7,055,777 B2* | 6/2006 | Colting | 244/30 |
| 7,708,222 B2 | 5/2010 | Lee | |
| 8,061,648 B2 | 11/2011 | Lachenmeier | |
| 2004/0195431 A1 | 10/2004 | Yumlu et al. | |
| 2006/0000945 A1* | 1/2006 | Voss | 244/97 |
| 2008/0087762 A1* | 4/2008 | Holloman et al. | 244/30 |
| 2008/0179453 A1 | 7/2008 | Thompson | |
| 2009/0152391 A1* | 6/2009 | McWhirk | 244/30 |
| 2012/0234964 A1* | 9/2012 | Heppe | 244/2 |
| 2012/0234965 A1* | 9/2012 | Heppe | 244/2 |
| 2012/0312911 A1* | 12/2012 | Heppe | 244/2 |
| 2012/0312918 A1* | 12/2012 | Heppe | 244/30 |
| 2012/0312919 A1* | 12/2012 | Heppe | 244/30 |
| 2013/0037650 A1* | 2/2013 | Heppe | 244/2 |

OTHER PUBLICATIONS

Sanswire Corporation, Unmanned Airship Solutions for Integrated ISR Systems; Technical White Paper, Jul. 24, 2007.

Graham Warwick, Higher ground: Stratospheric airships special report—Aug. 15, 2006—Washington DC—Flight International; Aug. 16, 2006.

Mitre, 12 Miles High; An Integrated Airship-Radar is on the Horizon, Mar. 15, 2010.

Craig L. Nickol et al., High Altitude Long Endurance UAV Analysis of Alternatives and Technology Requirements Development, NASA/TP-2007-214861; Mar. 2007.

George D. Modica et al., An Investigation of Stratospheric Winds in Support of the High Altitude Airship, Atmospheric and Environmental Research, Inc., Lexington, Massachusetts Systems Technology, Inc., Hawthorne, California; Sep. 21, 2010.

JP Aerospace, Something new at the boundary of Earth and space; Tandem Class Airships, http://www.jpaerospace.com/Tandem/tandem.html[Nov. 20, 2010 4:50:26 PM].

* cited by examiner

LIFTING GAS REPLENISHMENT IN A TETHERED AIRSHIP SYSTEM

RELATED DOCUMENTS

The present application is a continuation-in-part and claims the benefit under 35 U.S.C. §120 to U.S. application Ser. No. 13/159,215, filed Jun. 13, 2011, to Stephen Heppe and entitled "Tethered Airships," which is incorporated herein by reference in its entirety.

BACKGROUND

For any airship designed for long-endurance operation, one factor affecting endurance is the leakage of lifting gas. To overcome this problem, the airship can be designed to minimize the leakage rate of lifting gas (e.g., by proper hull design), or it can drop ballast as the lifting gas is depleted, or it can carry a reservoir of lifting gas in compressed form. The reservoir can be used to replenish lifting gas as required, until the reservoir is depleted.

In a tethered airship system such as disclosed in co-pending application Ser. No. 13/159,215, there is a strong motivation to keep the upper airship as light-weight as possible. If a way can be found to replenish the lifting gas with a relatively small on-board reservoir (with its associated tanks or other equipment for providing the lifting gas), or no on-board reservoir at all, the size of the upper airship and the weight of its hull can be minimized.

This invention is directed to the problem of external replenishment of lifting gas in a tethered airship system, although the invention may find other applications.

BRIEF DESCRIPTION OF THE DRAWINGS

The accompanying drawings illustrate various examples of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

A stratospheric balloon or airship is generally designed with a light-weight hull so as to minimize overall vehicle size. For example, balloons intended for operation in the upper stratosphere may have hull thickness less than 50 um, weighing less than 100 $g/m^2$ of effective hull surface area. The rate at which a lifting gas, such as H2, leaks from such a surface will depend on its material and construction as well as operational factors such as the internal pressure of the balloon. Generally, efforts are made to limit the leakage rate through careful design. Such efforts are especially important for long-endurance missions. U.S. Pat. No. 5,279,873, awarded to Oike, describes a hull material that exhibits a leakage rate for H2 of 3 $ml/m^2$ over a 24 hour period under standard atmospheric pressure (101 kPa). If this is scaled to the case of a large stratospheric airship with a surface area of 40,000 $m^2$ operating with an internal pressure of 520 Pa, the leakage rate would be on the order of 1 kg of lifting gas every 100 days. This must be replenished for long-duration missions, in order to prevent a loss of lifting capacity. A reservoir of lifting gas can be used, but for very long-duration missions, this reservoir may also require replenishment.

Figure 1:
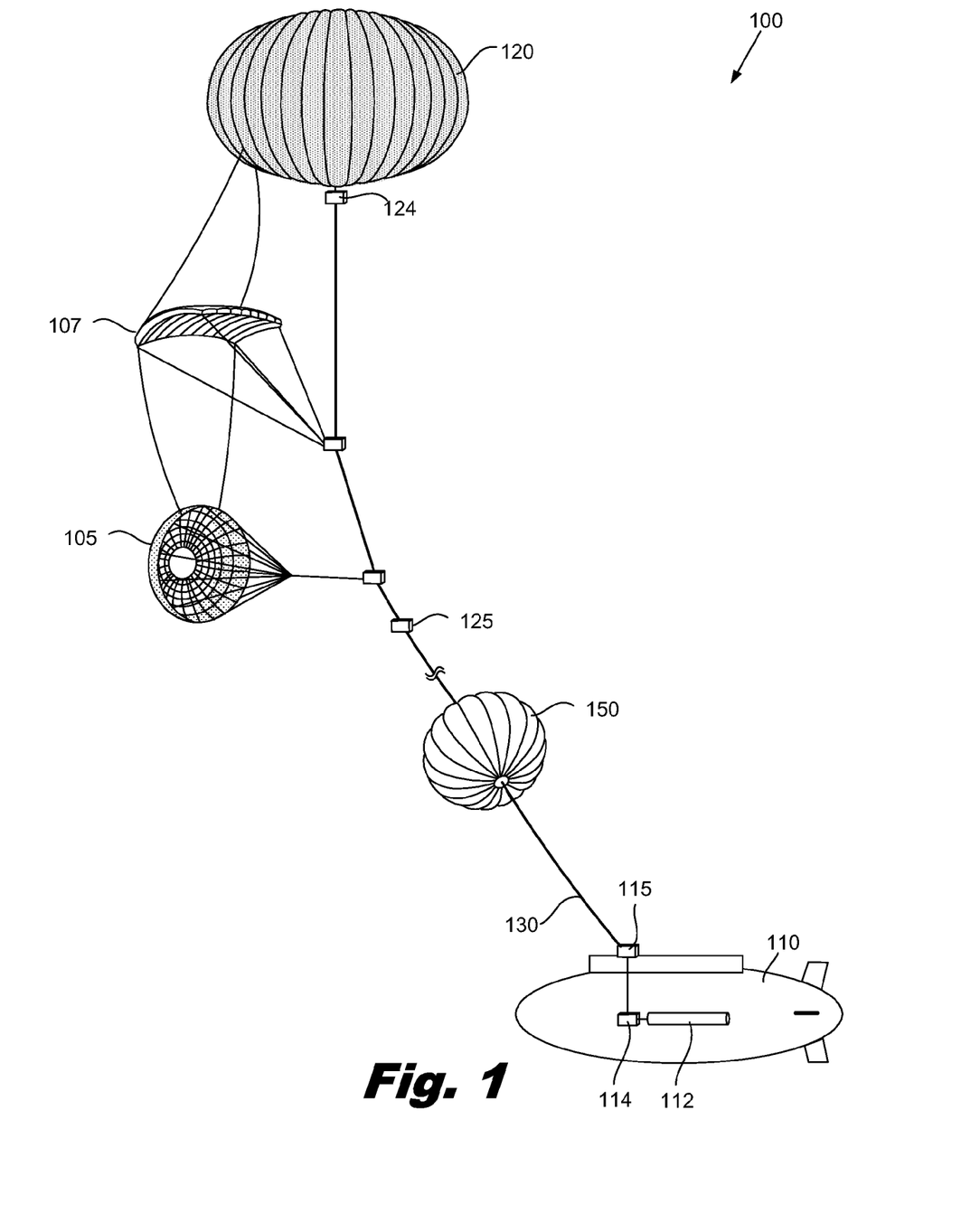
FIG. 1 is a schematic diagram identifying several of the subsystems of a tethered airship system designed to replenish the lifting gas of the upper airship with a reservoir of lifting gas carried by the lower airship, according to one example of principles described herein.

As illustrated in FIG. 1, the tethered airship system (100) with gas replenishment comprises a "balloon shuttle" 150 that can travel up and down on (or along) the tether 130 connecting the upper airship 120 (along with its associated subsystems) and lower airship 110. Docking fixtures 125 and 115, associated with the upper and lower airships, respectively, provide a means to: a) releasably dock the balloon shuttle at the upper and lower airship; and b) transfer lifting gas. The docking fixtures contain or are associated with valves (not shown) to allow the effective transfer of lifting gas to and from the balloon shuttle. Similarly, the balloon shuttle contains valves to allow the transfer of lifting gas when such transfer is desired, and prevent the venting of gas when such venting is not desired (see FIG. 2).

A number of additional elements may also be attached to the tether. For example, a parachute 105 and a parafoil 107 may be used to adjust lift and drag forces of the airship system. These additional elements are not integral components of the system or methods for lifting gas replenishment and can be included or omitted from the airship system based on other design parameters as described in U.S. application Ser. No. 13/159,215, filed Jun. 13, 2011 and entitled "Tethered Airships" to Stephen Heppe which is incorporated herein by reference in its entirety.

Also shown in FIG. 1 is a reservoir of lifting gas 112 on the lower airship 110, shown as a bottle of compressed gas, and a pump/valve assembly 114. The reservoir 112 and pump/valve assembly 114 are operably interconnected to each other and to the docking fixture 115, via suitable hoses or equivalent, so as to allow the commandable transfer of lifting gas from the reservoir 112 to the balloon shuttle 150 (when it is properly mated to the docking fixture 115), and similarly from the balloon shuttle 150 to the reservoir 112. Command and control hardware and software are not shown, but assumed to be present. Of course, the reservoir of lifting gas could also be used to replenish the lower airship; however, the description herein is focused on the replenishment of the upper airship. It should also be noted that the reservoir 112 could comprise multiple storage bottles (reservoirs) of possibly varying pressure and/or gas type.

Also shown in FIG. 1 is a pump/valve assembly 124, operably interconnected via suitable hoses (not shown) to the docking fixture 125 and the interior of the lifting volume of the upper airship 120. The pump/valve assembly allows the commandable transfer of lifting gas from the balloon shuttle 150 to the upper airship 120. As described in more detail below, the pump/valve assembly 124 may comprise both a pump and valve, or only a valve. The inclusion of a pump in the pump/valve assembly 124 allows the upper airship 120 to extract low-pressure gas from the balloon shuttle 150 (at, or only slightly above, ambient atmospheric pressure), and pump it into the higher-pressure (in some embodiments and under some operational conditions) lifting volume of the upper airship itself.

Not shown in FIG. 1, but assumed to be present, are control and automation subsystems to allow the effective control of the illustrated systems by human operators on the ground, or alternatively by automated control systems.

Figure 2:
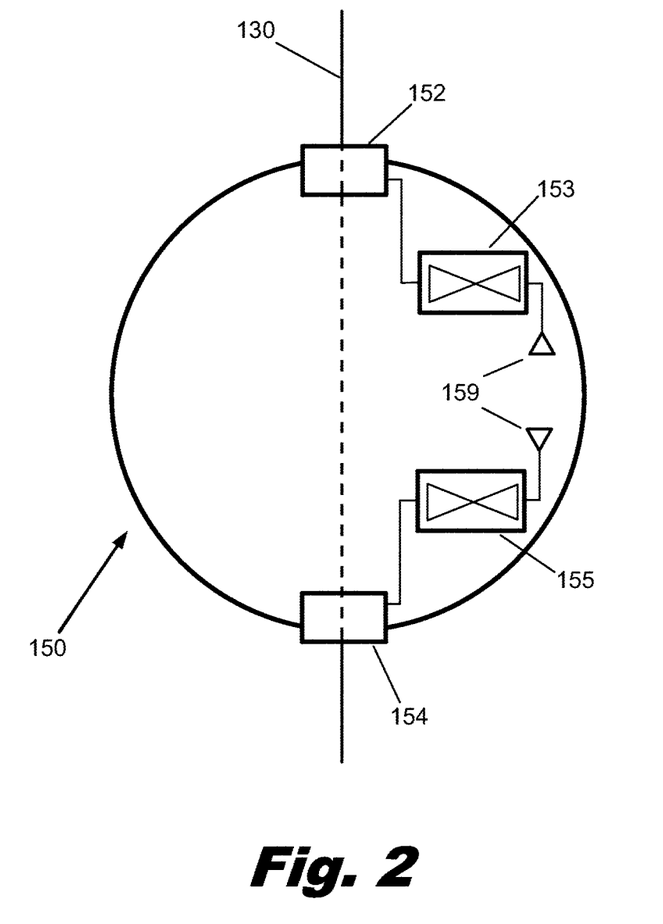
FIG. 2 illustrates certain subsystems of an illustrative balloon shuttle, according to one example of principles described herein.

FIG. 2 illustrates the balloon shuttle 150 with valves 153 and 155, which, together with the mating fixtures 152 and 154, allow the commandable transfer of gas into and out of the shuttle 150 through the apertures 159 contained therein. The mating fixtures 152 and 154 also allow the balloon shuttle to reversibly mate with the upper and lower airship, respectively. In one embodiment, the balloon shuttle has no onboard power source or active electronics, and the valves 153 and 155 are commanded and/or controlled by the upper and lower airship when the balloon shuttle is docked to one airship or the other. Specifically, the lower airship 110 can control the valve 155 when the balloon shuttle is mated to the lower airship's docking fixture 115 by its own mating fixture 154, and the upper airship 120 can control the valve 153 when the balloon shuttle is mated to upper airship's docking fixture 125 through its own mating fixture 152. A wide variety of electrical, magnetic, and mechanical mechanisms to achieve this control of the valves can be used and will not be discussed. Of course, the valve 153 and mating fixture 152 could be integrated into a single structure, and similarly the valve 155 and mating fixture 154 could be integrated into a single structure.

In another embodiment, the balloon shuttle 150 comprises an onboard equipment controller, command and telemetry system, and power source (such as a battery), and controls the valves 153 and 155 itself subject to commands received from the ground and/or the airships themselves (possibly in response to commands the airships have themselves received from the ground).

In normal operation, the balloon shuttle 150 may be assumed to be docked at the lower airship 110 when not in use (although this is not an inherent operating requirement or constraint of the inventive concept). It may be partially filled with lifting gas. When it is determined that lifting gas replenishment of the upper airship is required, the pump/valve assembly 114 and valve 155 is operated to transfer lifting gas from the reservoir 112 to the balloon shuttle 150. This makes the balloon shuttle more buoyant. If the balloon shuttle is passive, it can be made positively buoyant with sufficient buoyancy to reach the upper airship at the upper airship's current operating altitude. When a suitable increment of lifting gas has been transferred (see example below), the pump/valve assembly 114 and valve 155 are shut off to prevent the inadvertent venting of gas and the docking fixture 115 is operated to release the balloon shuttle 150. The balloon shuttle, now positively buoyant, rises along the tether 130 until it encounters the docking fixture 125 associated with the upper airship 120. At this point, the docking fixture 125 is operated to securely capture (dock) the balloon shuttle to the docking fixture. This includes the proper mating of gas transfer ports, electrical and/or mechanical interfaces, and latching of the balloon shuttle to the docking fixture 125 to prevent uncommanded separation. At this point, the pump/valve assembly 124 and valve 153 are operated to transfer a portion of the lifting gas from the balloon shuttle 150 to the upper airship 120. This partially or completely replenishes the lifting gas of the upper airship, makes the upper airship more buoyant, and makes the balloon shuttle 150 less buoyant. When a suitable increment of lifting gas has been transferred, the pump/valve assembly 124 and valve 153 are shut off to prevent the inadvertent venting of lifting gas, and the docking fixture 125 is operated to release the balloon shuttle. The balloon shuttle, now negatively buoyant, descends along the tether 130 until it encounters the docking fixture 115 associated with the lower airship, where it is docked to await further operations.

Optionally, in some embodiments, lifting gas can be pumped from the balloon shuttle 150 into the reservoir 112 in order to minimize the leakage of lifting gas as well as the overall volume of the balloon shuttle when it is not in use, allowing for more compact external storage on the lower airship 110, or even internal storage.

Initial Sizing Example

As one sizing example for the present inventive systems and methods, consider the tethered airship numerically described in co-pending application Ser. No. 13/159,215, entitled "Tethered Airships" to Stephen Heppe, which is incorporated herein by reference in its entirety. This illustrative system comprised a lower airship with length of roughly 111 m and lifting volume of roughly 60,000 m$^3$, designed to operate at altitudes between 18 km and 19 km. The upper airship had a lifting volume at maximum altitude of slightly under 500,000 m$^3$, a radius at maximum altitude of slightly less than 50 m, and was designed to operate at altitudes between 27 km and 37 km. The tether connecting the two could be "reeled in" or deployed by the lower airship to vary the altitude separation.

For this sizing example, it will be assumed that the replenishment system is designed to deliver roughly 1% of the lifting volume of the upper airship (5,000 m$^3$) in a single delivery to the maximum design altitude of the upper airship (37 km). This is equivalent to roughly 2.5 kg of H2 at a density of 0.5 g/m$^3$, associated with a balloon pressure of about 520 Pa. If the balloon material of the upper airship achieves the scaled leakage rate implied by Oike, this replenishment volume (or mass) would compensate for leakage over roughly 250 days. Clearly these design assumptions could be varied in several ways to accommodate various system and mission requirements.

The balloon shuttle for this first illustrative example is assumed to be built with a balloon material and construction technique such that the mass of the balloon shuttle, less mating fixtures, valves, and internal structure, is no greater than 25 g/m$^2$ of balloon surface area. This is justified on the basis that the balloon shuttle is not required to maintain a significant pressure difference through day/night cycles at its maximum design altitude.[1] The mating fixtures and valves are assumed to weigh 5 kg for the upper fixture/valve set and 5 kg for the lower fixture/valve set; furthermore, an additional 5 kg is assessed for internal structure of the balloon shuttle (see discussion below).

[1] By way of comparison, the Japanese space agency JAXA baselined a large stratospheric balloon (300,000 m$^3$) intended for a 10 day mission (therefore able to sustain a pressure difference through multiple day/night cycles of about 100 Pa) with a total balloon weight of 1200 kg. This is equivalent to an areal density (for the hull as a whole) of 54 g/m$^2$.

The lifting gas in the upper airship has a density at maximum altitude of about 0.5 g/m$^3$, so the 5000 m$^3$ of replenishment gas only weighs approximately 2.5 kg. Nevertheless, delivering this mass to the upper airship requires a balloon shuttle with a total lifting volume (at maximum altitude) of at least 20,000 m$^3$. An approximately spherical (pumpkinlobed) balloon of this size has a radius of about 17 m and a surface area of about 3600 m$^2$, thus a total hull weight of about 90 kg. Adding the contributions from the upper and lower mating fixtures and valves, and internal structure, the total balloon shuttle mass would be roughly 105-110 kg. The lifting capacity of hydrogen at 37 km altitude is about 5.5 g/m$^3$. Therefore, a balloon shuttle with lifting volume of 20,000 m$^3$ or slightly larger has a lifting capacity of about 110 kg, and can carry itself to altitude. This is especially true when considering solar warming of the balloon, which allows slightly greater buoyancy during the day (assuming the balloon can grow to a slightly larger size). Therefore, it is clear that a balloon of this approximate size and weight could be filled to be neutrally buoyant at the altitude of the upper airship (no higher than 37 km), assuming ambient temperature, yet achieve positive contact with the mating fixture of the upper airship during daytime operation (when the balloon is slightly warmer than the surrounding air).

In order to provide design margin with respect to lifting capacity, the balloon shuttle in this example is augmented to comprise a lifting volume of 22,000 m$^3$. This results in a balloon radius of about 17.4 m and a surface area of about 3800 m$^2$. The hull weighs about 95 kg and the total balloon shuttle weighs about 110 kg. It has a lifting capacity at maximum design altitude of about 120 kg, and can carry itself to altitude. Its "excess buoyancy" at maximum altitude is about 10 kg.

After offloading 2.5 kg of lifting gas, the balloon shuttle is now negatively buoyant and can be released to descend down the tether to the lower airship (optionally, waiting for nightfall may also be part of the operational procedure). The hydrogen gas in the balloon shuttle is at slightly lower pressure than the internal design pressure of the upper airship (assumed to be 520 Pa in this illustrative example). Therefore, offloading 2.5 kg of lifting gas reduces the lifting volume of the balloon shuttle by about 6000 m$^3$, to roughly 16,000 m$^3$. The total mass is reduced to about 107.5 kg, but the new (smaller) lifting volume can only carry a load of about 88 kg. Thus, after being depleted by the resupply activity, the balloon shuttle is negatively buoyant by about 20 kg. The descent to lower altitude results in an increase in ambient pressure by a factor of about 18:1 and a corresponding decrease in volume, so at the lower altitude (18 km), the lifting volume is ~16,000/18=890 m$^3$. Its lifting capacity at this lower altitude is 113 g/m$^3$, for a total of about 100 kg. Hence it is negatively buoyant by about 7 kg even at the lowest operating altitude of concern, and will positively mate with the mating fixture associated with the lower airship.

The preceding discussion has demonstrated that it is possible to repeatedly transfer lifting gas from a lower airship to an upper airship in a tethered airship system, using a passive or substantially passive balloon shuttle running along the tether, relying on changes in buoyancy associated with the on-loading and off-loading of lifting gas. The size of the balloon shuttle, and other details of the system, can be varied according a number of principles. For example, solar warming of the balloon shuttle during the day (and cooling during the night) can be advantageously employed to enhance the desired positive or negative buoyancy for the upward and downward journeys, respectively. If additional buoyancy margin is desired, the altitude of the upper airship can also be reduced or the airships can be operated so that wind forces tend to push the balloon shuttle along the tether in the desired direction.

Additional Considerations

Figure 3A:
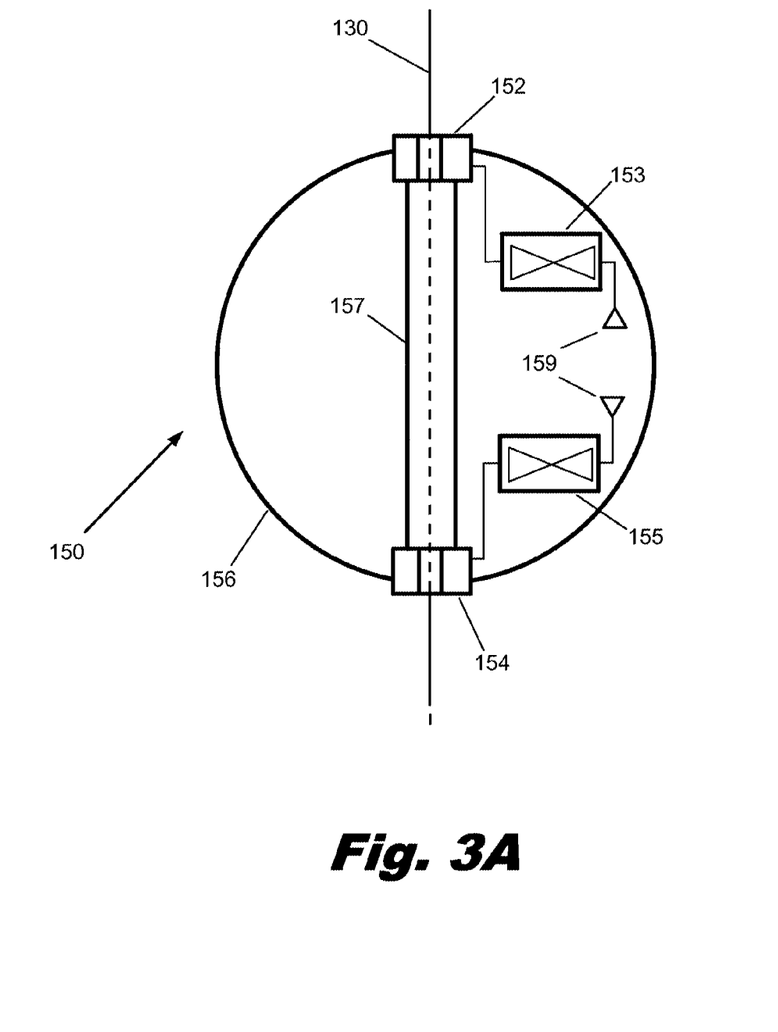
FIGS. 3A-3E illustrate additional features of an illustrative balloon shuttle, according to one example of principles described herein.

FIG. 1 illustrates the balloon shuttle as riding along the tether, with the tether actually running through the axis of the balloon, entering and exiting the balloon through its "north pole" and "south pole" at the location of the mating fixtures 152 and 154. Several techniques can be employed to prevent the leakage of lifting gas from the balloon through the points of ingress and egress of the tether. One option is to build the mating fixtures such that they can pass the tether with relatively low frictional losses, but prevent the leakage of lifting gas. FIG. 2 is a diagram showing this approach. Another option is to provide an inner balloon surface 157 running along the axis of the shuttle as illustrated in FIG. 3A. Here, the lifting volume of the balloon is topologically equivalent to a torus. It is bounded by the outer balloon surface 156, the inner balloon surface 157, and the mating fixtures 152 and 154 which serve as the junction between the outer surface and the inner surface. The central hole, or tube, accommodates the free passage of the tether 130. The mating fixtures 152 and 154 at top and bottom are still located at the "poles" of the balloon and surround the tether (at least in this embodiment), but the toroidal balloon design avoids the need for a gas-tight seal around the tether. Pneumatic ports and valves, shown in this figure, can be incorporated in the mating fixtures. For a balloon shuttle with an overall radius of 17.4 m (hence diameter of about 35 meters) and a central shaft with radius 10 cm, as illustrated in FIG. 3B, the inner surface 157 has a surface area of (2*pi*0.1 m)×(35 m)=22 m$^2$ and a mass of about 0.6 kg if constructed of the same material as the outer surface (assumed herein to have an areal mass density of 25 g/m$^2$).

Figure 3B:
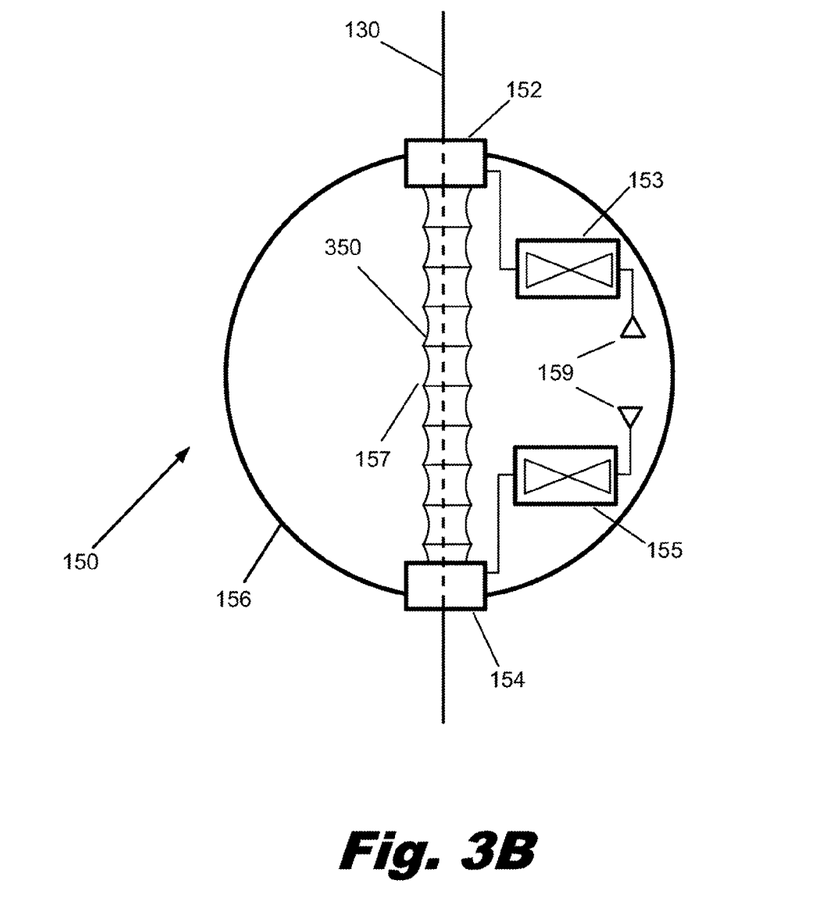
Figure 3C:
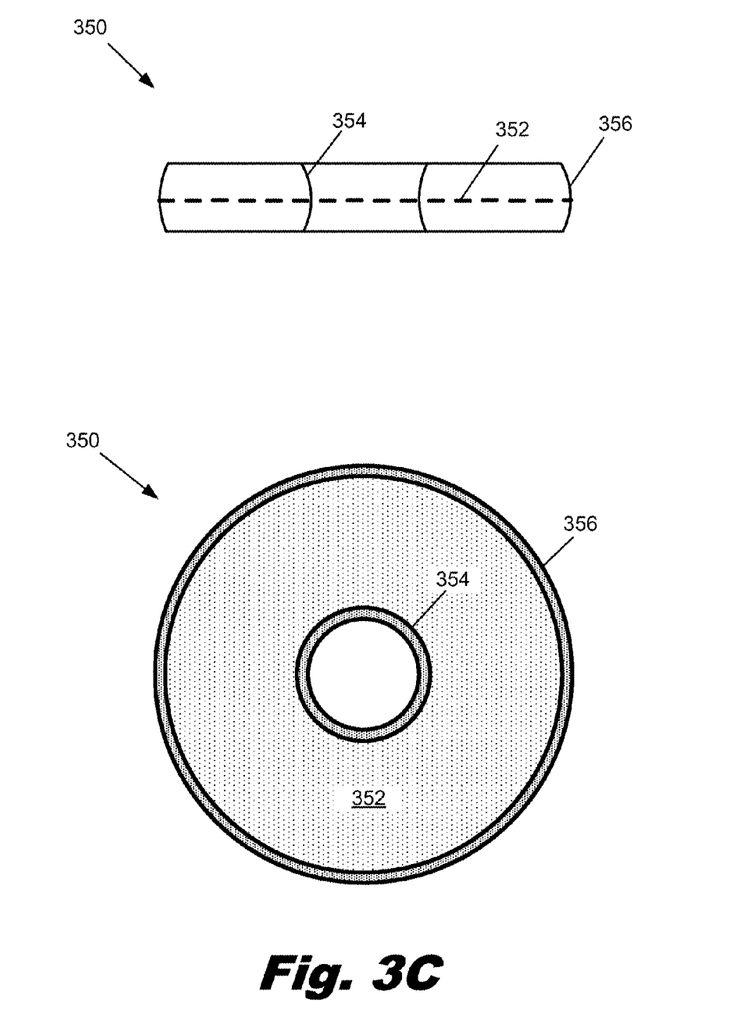

In order to prevent the inner surface 157 from contacting the tether and potentially becoming worn over time, the embodiment illustrated in FIG. 3A can be equipped with internal structure as shown in FIG. 3B, including a plurality of hoops 350 which provide a reinforcing framework for the inner surface 157. The hoops can be constructed of a lightweight material such as carbon composite, and should be designed to minimize strain on the inner surface 157, provide for free passage of the tether while minimizing the chance that the tether will contact the inner surface material where it may be curved inward between the hoops, and minimize the chance of abrasion between the tether and the hoops themselves. One suitable design for a hoop 350 is illustrated in the side view and top view of FIG. 3C. It is essentially a disk or "washer" of carbon composite material 352 with an inner curved surface 354 and outer curved surface 356 intended to minimize friction with the tether (for the inner curved surface 354) and minimize strain on the inner surface of the balloon 157 (for the outer curved surface 356). If the hoop 350 is constructed of carbon composite material 1 mm thick, with density 1800 kg/m$^3$, and the hoop is 20 cm in diameter with inner and outer curved surfaces 5 cm high, the volume of each hoop is less than 10$^{-4}$ m$^3$ and 16 such hoops (i.e., spaced 2 m apart along the central shaft) would have a total weight of about 3 kg. Hence the reinforced tube comprising the inner balloon surface 157 and plurality of hoops 350 have a total weight less than 4 kg (for the illustrated design), thereby validating the initial design assumption of 5 kg additional internal structure.

Figure 3D:
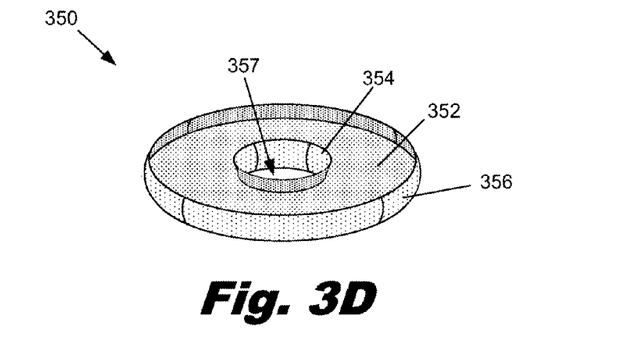
Figure 3E:
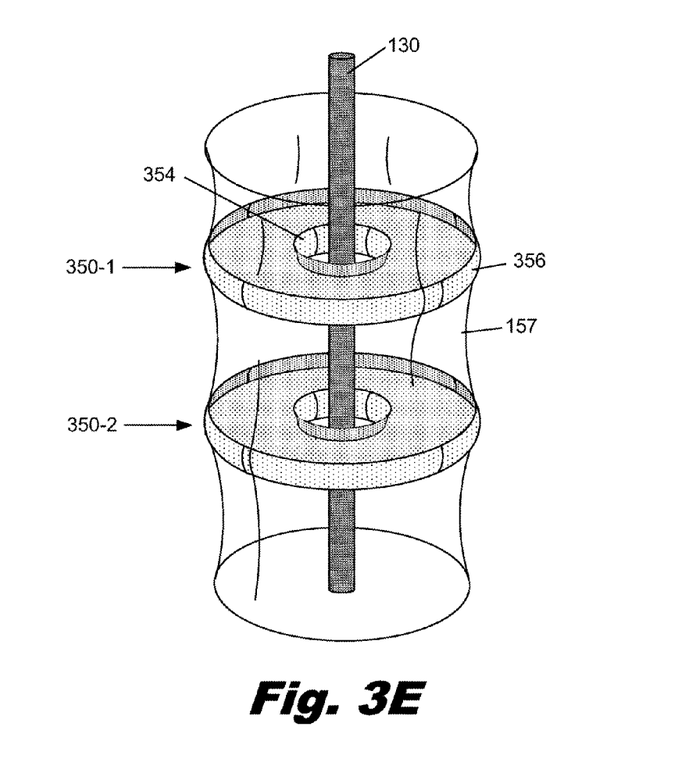

FIG. 3D is a perspective view of the hoop 350 and shows the central disk 352 that connects the curved inner surface 354 and the curved outer surface 356. The curved inner surface 354 defines a central aperture 357. FIG. 3F is a perspective view of a segment of the reinforced tube that passes through the center of the balloon shuttle 150. As discussed above, a number of hoops 350 are spaced along the reinforced tube. The outer curved surfaces 356 support the inner balloon surface 157 and hold it away from the tether 130. The curvature of the inner balloon surface 157 is influenced by a number of factors including the spacing between the hoops 350, the internal pressure of the balloon and the atmospheric pressure.

The tether 130 passes through the central apertures 357. The inner curved surfaces 354 are configured to contact the tether without damaging it. The inner curved surfaces 354 may be covered with a dry lubricant or lubricious material to minimize friction and abrasion of the tether. For example, the curved inner surfaces may include a coating of polytetrafluoroethylene.

Of course, the inventive concept is not limited to balloon shuttles of this illustrative design, or balloon shuttles with the weight characteristics as described illustratively above. A variety of other designs can be implemented using the principles described herein.

While the balloon shuttle is mated to the lower airship between resupply missions, it may encounter strong winds and the lower airship may adjust the length of the tether which passes through the shuttle. In order to enhance survivability and endurance, the inventive system can incorporate the additional apparatus of FIG. 4. Specifically, a small-diameter sheath 450 is included as part of the tether attachment/deployment system of the lower airship, surrounding the tether 300, and within (or passing through) the docking fixture 115. The sheath can also pass through the mating fixtures 152 and 154 of the balloon shuttle, as well as central holes of the hoops 350, as the balloon shuttle settles down to, and mates with, the lower airship after completion of a resupply run. The curved inner walls 354, of the hoops 350, also serve to ensure that the hoops will reliably pass over the end of the sheath without getting snagged.

Figure 4:
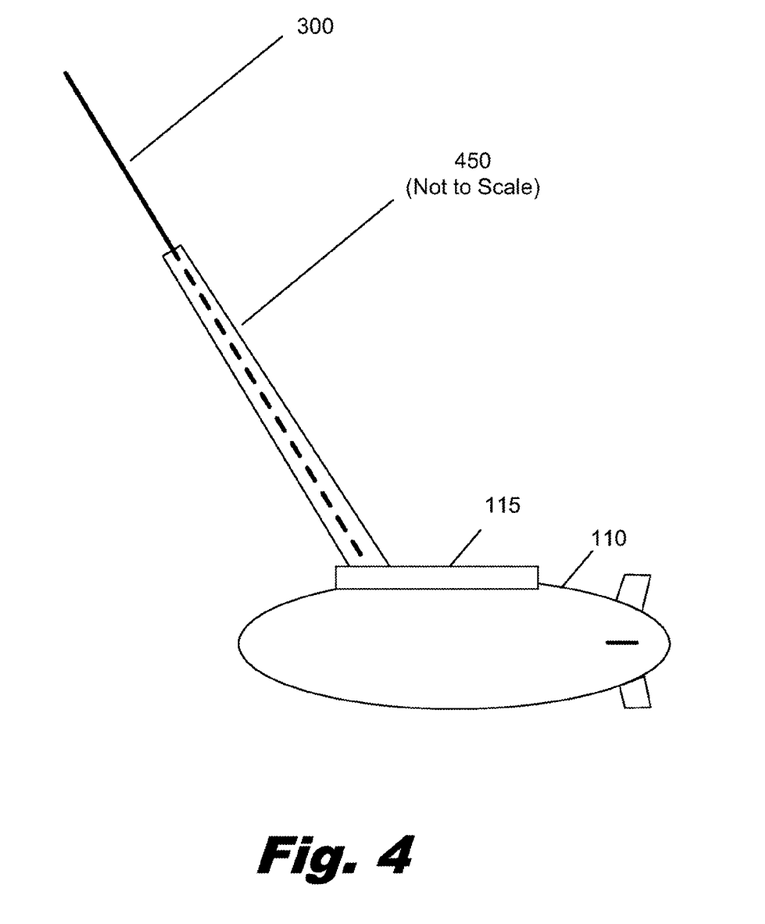
FIG. 4 illustrates an additional element of a lower airship and its associated docking system, that can be used to minimize risk of damage to a balloon shuttle mated to the lower airship, according to one example of principles described herein.

Once the balloon shuttle has settled over the sheath 450 and mated to the lower airship 110, the sheath protects the inner surface 157 of the balloon shuttle from abrasion as the tether is deployed and retracted.

In order to minimize wind resistance and potential damage to the balloon shuttle from high winds, when it is mated to the lower airship and not engaged in a resupply mission, the balloon shuttle can be fully deflated (de-gassed) using the pump/valve assembly 114, with the gas compressed and stored in reservoir 112 (or a similar reservoir). The loose material can then be left to flap in the wind, or it can be secured and/or stowed.

Figure 5:
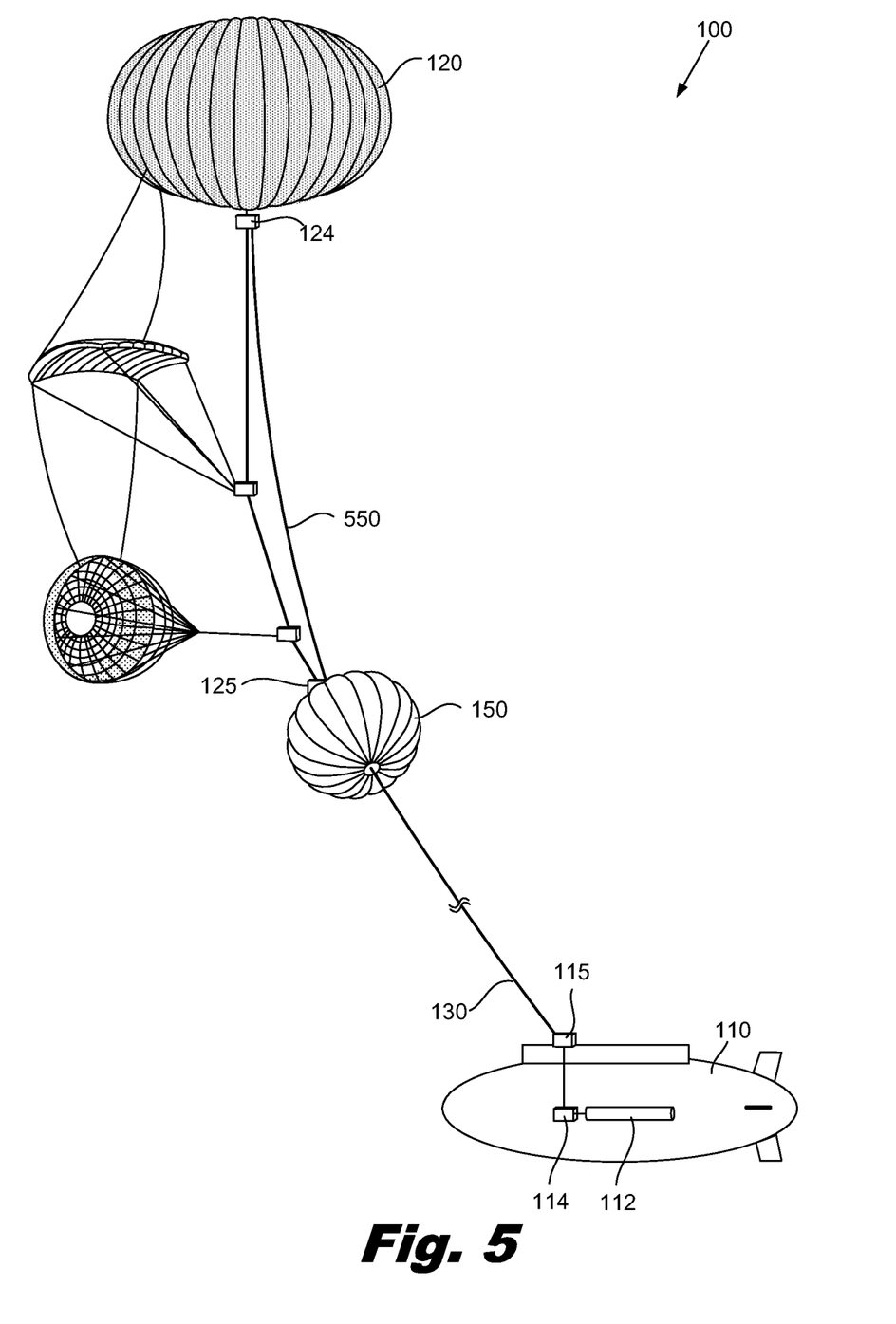
FIG. 5 illustrates the balloon shuttle mated to the upper airship, according to one example of principles described herein.

FIG. 5 illustrates the balloon shuttle mated to the upper airship with a pneumatic tube 550 allowing the transfer of lifting gas from the docking fixture 125, to the pump/valve assembly 124 (shown as integrated with the tether attachment mechanism in this view, although this is not an inherent requirement of the inventive concept), and thence to the upper airship 120.

Operating Schedule and Consideration of High Winds

When the winds are light or non-existent, the tether is essentially vertical and the two airships are at roughly the same latitude and longitude, separated only by altitude. The balloon shuttle operates as described above, ascending and descending along the tether affected primarily by its positive or negative buoyancy (which in turn is affected by the amount of lifting gas and its pressure and temperature relative to ambient conditions). Historical data indicate that winds in the stratosphere tend to reach a minimum every 14 months on average, at which point they tend to switch directions. Therefore, there are good opportunities to perform resupply every 14 months or so, along an essentially vertical tether with minimal impact from the wind. Several resupply trips could be performed within a single "lull" in the wind. For example, with the leak rate and balloon shuttle design described above, the tethered airship system in toto and the upper airship in particular could be designed to allow depletion by several percent, anticipating two or more resupply missions at each "lull" in the wind spaced roughly 14 months apart.

If the overall system design is such that more frequent resupply is needed (i.e., not relying solely on the periods of very low wind), several techniques can be employed to operate in high winds when the tether is not substantially vertical.

Figure 6:
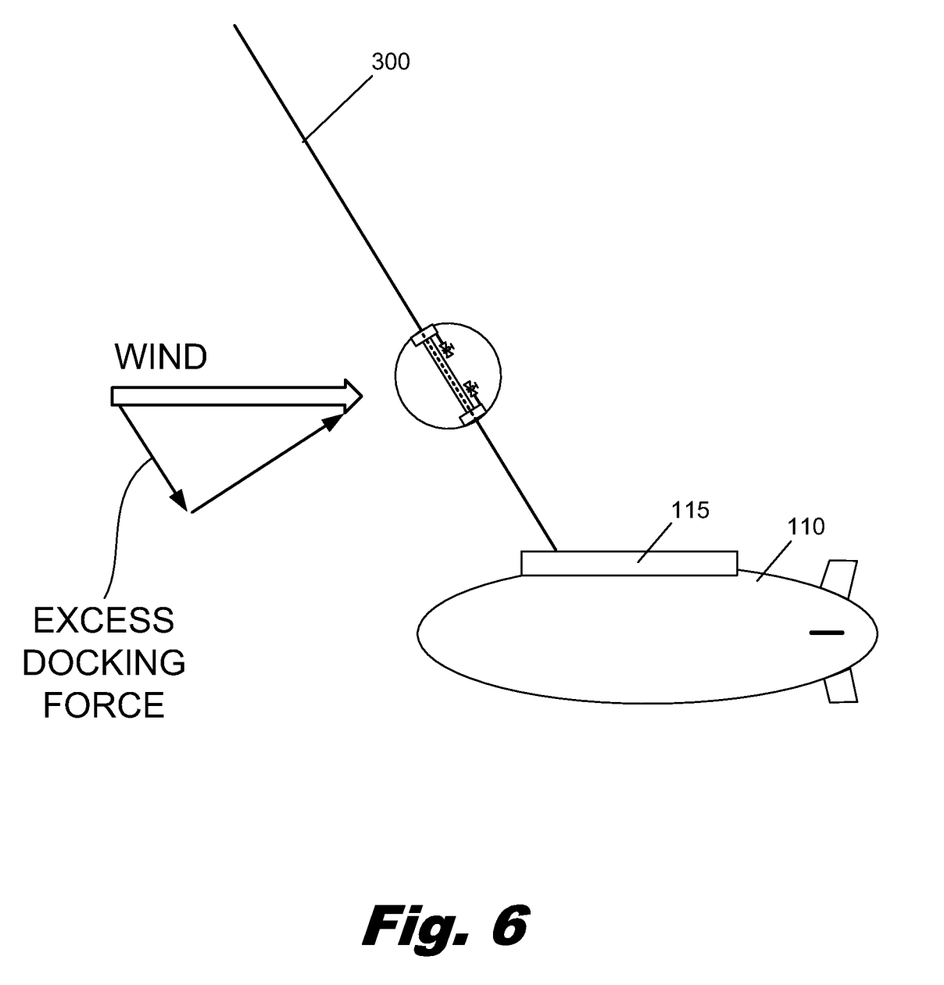
FIG. 6 is a force diagram showing wind-induced forces on the balloon shuttle as it is mated to a lower airship, according to one example of principles described herein.

First, it is useful to recognize that high winds operating on a tethered airship system with a balloon shuttle will tend to provide an additional "docking force" that promotes docking with each airship but impedes departure. This is clear from consideration of FIG. 6 which shows the direction of the wind for a typical operating scenario. Taking the balloon shuttle mated to the lower airship of FIG. 6 as an example, the ambient winds impart a force along the tether directed toward the airship. This tends to support docking but hamper departure. The force that must be overcome is a function of the wind speed, ambient atmospheric density, tether angle from the vertical (which is a function of wind speed at both the lower and upper airships, as well as the detailed design and current operating characteristics of the airships), and the drag characteristics of the balloon shuttle itself (which depend on the surface material, overall size, and degree of inflation). High winds tend to result in non-vertical tethers, and both high winds and non-vertical tethers contribute to the excess "docking force" which must be overcome to depart an airship. In many high-wind scenarios, the excess "docking force" will exceed the forces tending to favor departure (i.e., due to the positive or negative buoyancy of the balloon shuttle, considering the angle of the tether), and the shuttle will not depart without assistance.

One method that can be employed to enable departure in high wind conditions, in some meteorological scenarios, is to adjust tether length so that both the lower and upper airships are experiencing similar winds. In combination with the propulsion capability of the lower airship, the tether angle can be partially controlled and this may be sufficient to enable the balloon shuttle to depart its current docking point. The overall system may not be able to maintain station-keeping relative to a fixed point on the Earth during this exercise, but this may be an acceptable penalty if resupply is necessary.

Detailed simulation can be used to gain an appreciation for the relative periods of time during which resupply operations will be feasible without adjusting tether length, versus those periods of time when resupply will only be feasible with an adjustment of tether length (and possible loss of station-keeping), or not feasible at all (given the design constraints of the system).

Another method that can be used, for departure from the lower airship, is to heat the lifting gas of the balloon shuttle so that it increases its lifting volume, thereby increasing buoyancy and overcoming the "docking force" caused by the wind. The heating can be achieved with ambient solar incidence or an internal heater in the balloon shuttle powered by the lower airship, or passive heating by the lower airship (perhaps by painting the area under the balloon shuttle a dark color, or by circulating the lifting gas of the balloon shuttle through the lower airship and heating it with a gas heater contained within the lower airship). This method, regardless of the source of heat, takes advantage of the fact that the balloon shuttle is nominally quite "flaccid" when it is docked at the lower airship, with lifting volume on the order of only $1/20^{th}$ of the volume it will display at maximum altitude. So there is no risk of damage to the balloon shuttle due to overpressure while it is in the vicinity of the lower airship, and buoyancy can be increased simply by increasing the temperature of the balloon shuttle's lifting gas, and thus its volume. However, it is important, when using this technique, to verify through analysis or simulation that an overpressure condition (due to excessively high gas temperature) will not occur as the balloon shuttle ascends to altitude.

If it becomes necessary to depart the upper airship under high winds, and the nominal negative buoyancy of the balloon shuttle (i.e., after performing its resupply mission) and the normal day/night temperature variations are inadequate to allow departure, the upper airship could pump off additional lifting gas and either store it internally in a high-pressure reservoir, or add it to its own lifting volume (if the additional pressure is tolerable), or vent it to the atmosphere. By any of these mechanisms, the balloon shuttle can be made more negatively buoyant, so as to enable undocking and descent down the tether.

Additional Embodiments

The preceding discussion has focused on a passive or substantially passive embodiment of a balloon shuttle system that has no active electronics or energy storage devices on board, or, if such apparatus exists, it is substantially unused during ascent and descent.[2] However, additional operational and safety functionality can be achieved with a more capable shuttle that contains electronics, energy storage, and possibly other hardware. For example, a small tractor motor could be installed in each mating fixture of the balloon shuttle to allow the shuttle to pull itself either up or down the tether, if buoyancy forces are inadequate (e.g., to assist in departure from the upper or lower airship, and even to provide propulsion along the length of the tether). Additionally, a small brake assembly could be incorporated in the mating fixture(s) of the balloon shuttle, and used to limit the speed of ascent or descent if it becomes excessive, to facilitate safe docking, or even to stop the shuttle completely if such action is needed (e.g., to wait for temperature change to protect the shuttle from an overpressure condition during ascent). Onboard sensors, microcontrollers or computers, and communication equipment can provide for status monitoring and reporting and command reception. Active systems can also be used to help stow and/or secure the shuttle when it is docked at the lower airship for long periods of time.

[2] Electronically actuated components, such as valves and sensors, could be powered via electrical contacts in the mating fixtures of the upper and lower airships, and used/operated while the balloon shuttle is mated to one airship or the other.

While docked at the upper airship, after delivering its intended load of lifting gas, the balloon shuttle will be partially depleted and the total volume of lifting gas in the shuttle will be on the order of 16,000 m$^3$ (for the numerical example discussed above). The balloon shuttle will, therefore, appear somewhat "flaccid" and its surface could become subject to fluttering and damage. In order to maintain a marginally positive differential pressure relative to ambient, in at least some embodiments, the balloon shuttle can be "compressed" along its axis to force the overall shape of the balloon shuttle into an approximation of a horn torus. For example, whereas a sphere of radius 17.5 m has a volume of approximately 22,000 m$^3$, a horn torus with major and minor radii of 8.75 m has a volume of approximately 13,000 m$^3$. This is about 3000 m$^3$ less than the volume of lifting gas contained in the balloon shuttle after it has delivered its intended load (for the numerical example given above). Thus, by bringing the upper and lower mating fixtures of the balloon shuttle into closer proximity along the shuttle's axis, an approximate torus of proper internal volume can be achieved with marginally positive differential pressure relative to ambient (at maximum altitude). One way to achieve this goal with a passive shuttle as illustrated in FIG. 3B is to equip the docking fixture 125 of the upper airship with a small-diameter, adjustable-length sheath that can penetrate the length of the balloon shuttle's axis, releasably latch or capture the lower mating fixture 154 of the balloon shuttle, and then retract back toward the docking fixture 125 so as to reduce the separation distance between the mating fixtures 152 and 154 of the balloon shuttle. Thus, while docked at the upper airship and following resupply, the balloon shuttle can be forced into a shape that approximates a torus and maintains a marginally positive pressure differential relative to ambient atmospheric pressure.

The preceding discussion has focused primarily on a passive (or substantially passive) shuttle which delivers an increment of lifting gas in each "visit" to the upper airship, and which retains a significant volume of lifting gas for its downward journey, so that buoyancy is only slightly negative (see numerical example above). If it is desired to deliver a greater increment of lifting gas, potentially the entire contents of the balloon shuttle could be pumped into the upper airship. However, this would increase the magnitude of the negative buoyancy of the shuttle on descent. For the numerical example given above, the "negative buoyancy" would be roughly 100 kg (the empty weight of the shuttle) if it were fully depleted. Furthermore, whereas a partially-depleted shuttle experiences significant atmospheric drag on descent as its speed increases, a completely empty shuttle might experience very little drag, and consequently its speed—if unchecked—could become quite high. This could endanger the lower airship as well as, potentially, the tether. In an embodiment that is adapted to completely (or nearly completely) depleting the shuttle at the upper airship (as well as other embodiments), the downward velocity can be checked or controlled by use of a brake that is in contact with the tether (or by use of a brake that interacts with the tether in other ways, such as electromagnetically), or a parachute attached to the shuttle and designed and operated to manage the velocity on descent. Such systems could be controlled by use of a microcomputer, suitable actuators, and an energy storage device on the shuttle such as a battery. A regenerative braking system could be used to recharge the battery, or run other onboard systems, as the shuttle descends down the tether.

The embodiments discussed above do not include any pumps on the shuttle itself (the pumps being hosted on the upper and lower airship). However, in another embodiment, the shuttle comprises a pump that can pump the lifting gas from the shuttle into a higher-pressure environment such as the lifting volume of the upper airship, the lifting volume of the lower airship, or a high-pressure reservoir such as tank 112 illustrated in FIG. 1 (or its equivalent). Power to drive the pump can be derived from the upper or lower airship via electrical contacts in the mating fixtures. In an embodiment where the balloon shuttle comprises a pump capable of delivering gas to the (possibly higher-pressure) lifting volume of the upper airship, the pump on the upper airship can be eliminated unless it is desired to be retained for redundancy and safety purposes.

Figure 7:
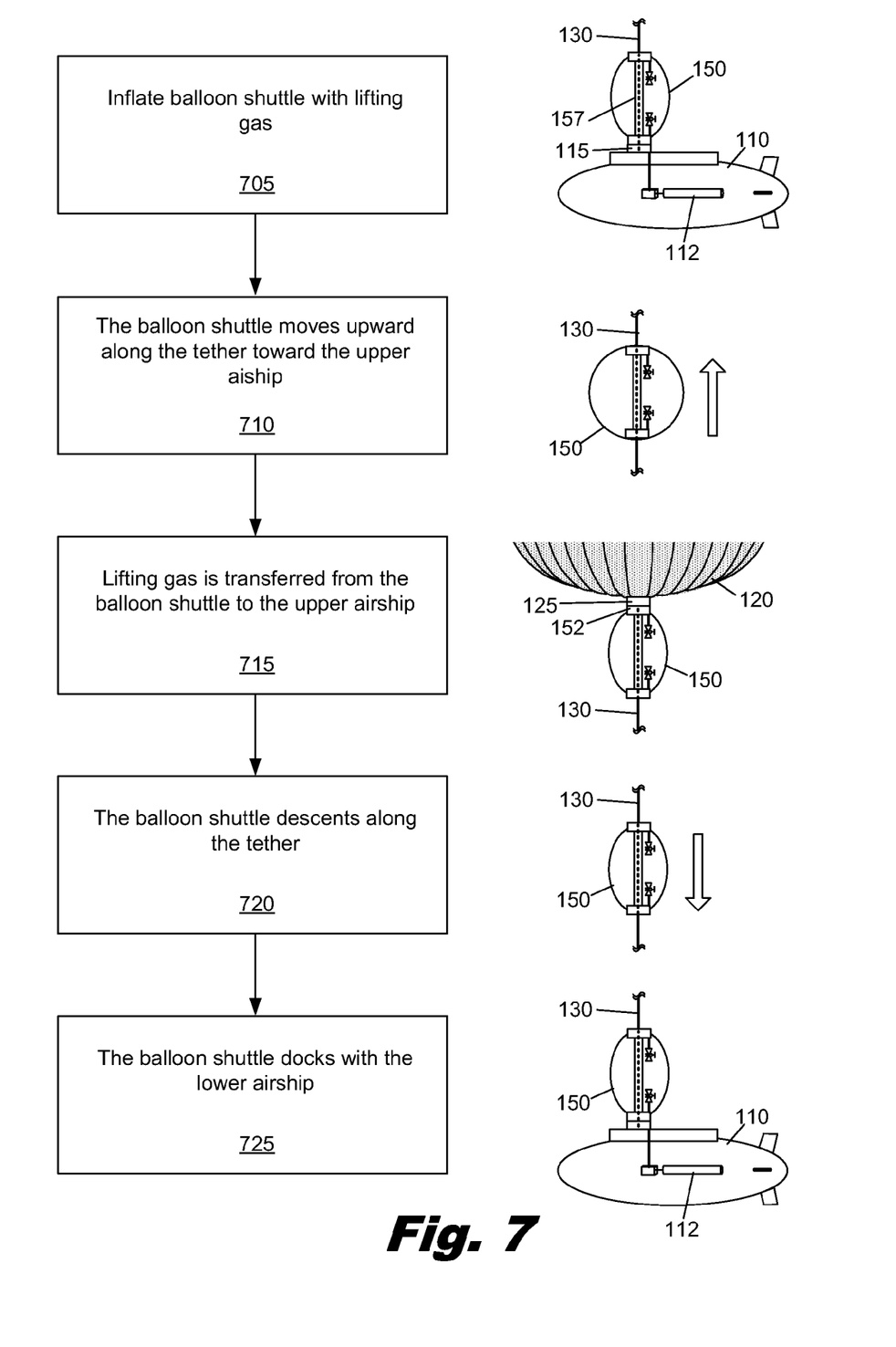
FIG. 7 is a flowchart of an illustrative method for replenishing lifting gas in an airship, according to one example of principles described herein.

FIG. 7 illustrates a method for gas replenishment of an airship 120. As discussed above, and in this example, a tether 130 extends from an upper airship 120 down to a lower airship 110. In this example, the upper and lower airships along with the tether comprise a free flying airship system that is designed for long duration operations and stationkeeping via drag equalization (at least in part). In other embodiments, the airship 120 may be tethered to a fixed anchor point or structure on the ground (i.e., instead of a lower airship), or to a movable anchor platform such as a truck or ship.

To replenish the lifting gas supply of an (upper) airship 120, a balloon shuttle 150 is inflated with lifting gas (step 705). This lifting gas is supplied and transferred to the balloon shuttle 150 by the lower airship 110 (or a suitable structure and apparatus associated with a fixed ground anchor point or movable anchor platform). When inflated with lifting gas, the balloon shuttle 150 is positively buoyant with sufficient buoyancy to reach the airship 120 at the airship's current operating altitude. In some situations, the balloon shuttle 150 moves upward along the tether 130 to the airship 120 under its own buoyant force.

In one implementation, the tether 130 is threaded through a tube 157 in the interior of the balloon shuttle 150. As discussed above, the tube 157 may have a variety of configurations, including internal reinforcements that approximately maintain the shape of the tube 157 when the balloon shuttle 150 is pressurized, and which also prevent contact with the tether.

The balloon shuttle 150 is disengaged from the lower docking fixture 115 (or suitable equivalent) and moves upward along the tether 130 toward the airship 120 (step 710). A mating fixture 152 on the balloon shuttle 150 engages and mates with a docking fixture 125 connected to the airship 120. For example, the docking fixture 125 may be located a distance down the tether 130 from the airship 120 as illustrated in FIGS. 1 and 5. Alternatively, the docking fixture may be located on, or proximate to, a lower portion of the airship 120 as shown in FIG. 7.

The lifting gas from the balloon shuttle 150 is transferred to the airship 120 (step 715). The transfer of lifting gas to the airship 120 may be active or passive. For example, a pump may be used to transfer lifting gas from the balloon shuttle 150 to the airship 120. Additionally or alternatively, if the pressure of the lifting gas in the balloon shuttle 150 is higher than a pressure of lifting gas in the airship 120, this pressure differential can be used to transfer at least a portion of the lifting gas.

After transferring a portion of the lifting gas, the balloon shuttle 150 is negatively buoyant and descends along the tether 130 under its own weight (step 720). As discussed above, the remaining lifting gas can prevent the balloon shuttle from descending too rapidly down the tether. In other embodiments, substantially all of the lifting gas can be transferred to the airship 120 and the balloon shuttle 150 can utilize a braking mechanism during descent.

Where wind conditions make motion of the balloon shuttle 150 along the tether 130 difficult, the free flying airship system may change its speed, direction, or altitude to reduce the aerodynamic forces experienced by the balloon shuttle 150. In some implementations, the system may include active drive mechanisms which move the balloon shuttle 150 away from a docking fixture associated with the upper or lower end of the tether, or use temporary buoyancy enhancement techniques (such as heating of the lifting gas) to move the balloon shuttle 150 away from the docking fixture associated with the lower end of the tether. This can assist the balloon shuttle 150 motion in adverse wind conditions.

The balloon shuttle 150 docks with the lower airship 110 (step 725). The lifting gas in the balloon shuttle 150 can remain in the balloon shuttle or be moved into the lower airship. The balloon shuttle may remain outside the lower airship or be stowed internally.

In sum, the systems and methods for lifting gas replenishment in a tethered airship system allow for long endurance airship missions. These long endurance airship missions can support a variety of operations including communication, observation, remote sensing and other operations. The lifting gas replenishment of the upper airship compensates for gas loss and preserves or renews its buoyancy without requiring a return of the airship to a base station.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A system for lifting gas replenishment in a tethered airship system comprising:
    an upper airship;
    a tether and tether attachment mechanism, wherein a length of the tether is at least eight kilometers, a first end of the tether attached to the upper airship via the tether attachment mechanism; and
    a balloon shuttle configured to travel up the tether toward the upper airship carrying a payload of lifting gas, wherein the payload of lifting gas provides positive buoyancy for the balloon shuttle.

2. The system of claim 1, in which the tethered airship system is tethered to a fixed anchor point on the ground or a movable anchor platform.

3. The system of claim 1, further comprising a lower airship attached to a second end of the tether, in which the tethered airship system is free flying and configured to maintain long duration stationkeeping.

4. The system of claim 3, in which the lower airship comprises a supply of lifting gas for transfer to the balloon shuttle.

5. The system of claim 1, further comprising a docking fixture fluidically connected to the upper airship, an upper surface of the balloon shuttle comprising a mating fixture configured to mate with the docking fixture and transfer lifting gas to the docking fixture.

6. The system of claim 1, in which a pressure of the lifting gas in the balloon shuttle is higher than a pressure of lifting gas in the upper airship, the transfer of at least a portion of the lifting gas in the balloon shuttle being driven by a difference in pressure.

7. The system of claim 3, further comprising a lower docking fixture fluidically connected to the lower airship.

8. The system of claim 1, in which the balloon shuttle comprises a reinforced tube passing through the balloon shuttle, the reinforced tube configured to receive the tether and allow the tether to pass through the tube as the balloon shuttle moves along the tether.

9. The system of claim 1, in which the balloon shuttle is positively buoyant when carrying the payload of lifting gas, the balloon shuttle ascending the tether under its own buoyant force.

10. The system of claim 1, in which the balloon shuttle is negatively buoyant after transferring at least a portion of the lifting gas to the upper airship and descends the tether under its own weight.

11. The system of claim 1, further comprising a sheath covering a portion of the tether, the sheath configured to protect the balloon shuttle from damage by the tether when the balloon shuttle is not in use.

12. A method for gas replenishment of a tethered airship comprising:
    inflating a balloon shuttle with lifting gas to yield positive buoyancy;
    moving the balloon shuttle upward along a tether toward the airship; and
    transferring at least a portion of the lifting gas from the balloon shuttle to the airship.

13. The method of claim 12, in which the tether passes through the balloon shuttle and controls a path of the balloon shuttle.

14. The method of claim 12, in which the balloon shuttle is positively buoyant with sufficient buoyancy to reach the airship at the airship's current operating altitude, in which moving the balloon shuttle upward along the tether comprises the balloon shuttle ascending the tether under its own buoyant force.

15. The method of claim 12, further comprising returning the balloon shuttle back down the tether, in which the balloon shuttle is negatively buoyant after transferring the lifting gas to the airship, the balloon shuttle descending the tether under its own weight.

16. The method of claim 12, in which transferring the lifting gas from the balloon shuttle to the airship comprises transferring less than half of the lifting gas in the balloon shuttle to the airship.

17. The method of claim 12, in which transferring the lifting gas from the balloon shuttle to the airship comprises transferring substantially all the lifting gas in the balloon shuttle to the airship, the balloon shuttle employing a braking mechanism during descent along the tether.

18. The method of claim 12, in which the balloon shuttle comprises a tube passing through a balloon, the method further comprising threading the tether through the tube.

19. The method of claim 12, further comprising engaging an active drive mechanism to move the balloon shuttle away from a docking fixture.

20. The method of claim 12, in which the airship is an upper airship in a free flying tethered airship system.

21. The method of claim 12, further comprising altering a relative speed of the airship system with respect to the surrounding air to reduce aerodynamic forces on the balloon shuttle.

22. An airship system comprising:

an upper airship;

a lower airship comprising a supply of lifting gas for transfer to the upper airship;

a tether, an upper end of the tether attached to the upper airship and a lower end of the tether attached to the lower airship, in which the airship system is free flying;

an upper docking fixture in fluidic communication with the upper airship;

a lower docking fixture in fluidic communication with the lower airship; and a balloon shuttle configured to controllably accept lifting gas from the lower docking fixture, travel up the tether to the upper docking fixture and deliver at least a portion of the lifting gas to the upper airship via the upper docking fixture.

* * * * *